United States Patent [19]
Mosher

[11] Patent Number: 6,079,147
[45] Date of Patent: Jun. 27, 2000

[54] ADJUSTABLE BOBBER SYSTEM

[76] Inventor: Bruce Mosher, P.O. Box 104, Beltrami, Minn. 56517

[21] Appl. No.: 09/228,202

[22] Filed: Jan. 11, 1999

[51] Int. Cl.$^7$ ..................................................... A01K 93/00
[52] U.S. Cl. ........................ 43/44.95; 43/44.87; 43/43.14
[58] Field of Search ............................... 43/44.87, 43.14, 43/17.5, 44.92, 44.93, 44.95; 441/6

[56] References Cited

U.S. PATENT DOCUMENTS

| | | | |
|---|---|---|---|
| 1,934,845 | 11/1933 | Durham | 43/44.95 |
| 1,942,738 | 1/1934 | Zimmer | 43/44.95 |
| 2,103,451 | 12/1937 | Durham | 43/44.95 |
| 2,127,667 | 8/1938 | Pflueger | 43/44.95 |
| 2,815,604 | 12/1957 | Fiscus | 43/44.95 |
| 4,202,128 | 5/1980 | Hill | 43/43.14 |
| 5,213,405 | 5/1993 | Giglia | 43/17.5 |

Primary Examiner—Kurt Rowan
Attorney, Agent, or Firm—Michael S. Neustel

[57] ABSTRACT

An adjustable bobber system for allowing adjustment of the buoyancy and for attaching to a fishing line without the use of a bead. The inventive device includes a hook member connected to a buoyant member. The hook member includes a body with an open end that receives the buoyant member, a jaw extending from the body with a slot within, and a slit extending into the jaw to the slot for receiving the fishing line below a stop knot. The buoyant member is preferably constructed of an elongated buoyant material, such as plastic foam, that is easily severed in any position by a cutting device. The user first ties the stop knot along the fishing line in the desired location. The user then simply engages the hook member upon the fishing line below the stop knot. If the user desires less remaining buoyancy, the user simply removes a portion of the buoyant member with a conventional cutting device, such as a scissors. A marker band is preferably adjustably positioned about the buoyant member for providing a visible mark upon the buoyant member that is a finite distance above the water level when the fishing lure and/or bait are attached. If the fish engages the bait and pulls the buoyant member downwardly, the marker band will become submerged informing the fisherman that a fish is present. Because the hook member remains in contact with the fishing line at all times beneath the water surface, there is not freezing of the fishing line to the hook member. In addition, any ice buildup upon the buoyant member can be easily removed by simply squeezing or bending the buoyant member without breaking or damaging the buoyant member.

14 Claims, 4 Drawing Sheets

ADJUSTABLE BOBBER SYSTEM

BACKGROUND OF THE INVENTION

1. Field of the Invention

The present invention relates generally to bobber devices and more specifically it relates to an adjustable bobber system for allowing adjustment of the buoyancy and for attaching to a fishing line without the use of a lead bead.

Ice fishing is an extremely popular sport in colder climates. When fishing with a bobber in an ice hole, it is desirable to utilize a bobber that is slidably positioned about the fishing line to allow reeling of the fishing lure along with a fish through the ice hole. Because the ice fisherman is utilizing a bobber, it is desirable to have a bobber that has little buoyancy remaining after the bait and hook are applied so as to allow a fish to engage the bait and "drag" it for a distance without having to apply much force. However, conventional bobber devices require the use of "beads" and "split shots" which are difficult to remove from the fishing line. Also, conventional bobbers have a bulbous shape making it difficult to achieve the desired buoyancy with the bait and hook applied. Hence, there is a need for a bobber system that has an adjustable buoyancy and that does not require the use of beads.

2. Description of the Prior Art

Bobber devices have been in use for years. Conventional slip bobbers require severing of the fishing line and insertion of the freshly cut line through an aperture through the center of the conventional slip bobber. The ice fisherman must then secure a "stop knot" or "tie knot" to the fishing line at the desired position to prevent the bobber from slipping further up the fishing line. The fresh cut end of the fishing line is then attached to a leader or fishing lure. In addition, the fisherman must secure a bead between the stop knot and the bobber. The bead is larger in diameter than the interior diameter of the aperture through the bobber. This is a very cumbersome process for an ice fisherman, especially during extreme weather conditions.

Another practice among ice fisherman is to apply "split shots" to the fishing line, which are basically lead weights near the fishing lure. Because conventional bobbers have a bulbous shape to them, they have a broad central area that has a high buoyancy per height unit. To counterbalance a bobber wherein the water level is centrally position, it is desirable to add split shots so that only the upper narrower portion is exposed thereby making it easier for a fish to take under the water. This increases the ice fisherman's chances of catching a fish that has been "nibbling" upon the fishing lure or bait. An obvious disadvantage to this is that it can be difficult to see the bobber within an ice hole, especially if the water level is significantly below the surface of the ice. Another disadvantage is that the split shots can be difficult to remove from the fishing line thereby forcing the fisherman to sometimes sever a portion of the fishing line if weighted to heavily. Another disadvantage is that if too many split shots are attached to the line to reach the desired buoyancy of the slip bobber, the bait is then restricted in movement because of the extra weight. Hence, there is a need for a bobber system that overcomes these shortcomings of the prior art bobber devices.

While these devices may be suitable for the particular purpose to which they address, they are not as suitable for allowing adjustment of the buoyancy and for attaching to a fishing line without the use of a bead. Conventional slip bobber devices require the use of beads. In addition, conventional bobber devices are incapable of being easily adjusted for their buoyancy.

In these respects, the adjustable bobber system according to the present invention substantially departs from the conventional concepts and designs of the prior art, and in so doing provides an apparatus primarily developed for the purpose of allowing adjustment of the buoyancy and for attaching to a fishing line without the use of a bead.

SUMMARY OF THE INVENTION

In view of the foregoing disadvantages inherent in the known types of bobber devices now present in the prior art, the present invention provides a new adjustable bobber system construction wherein the same can be utilized for allowing adjustment of the buoyancy and for attaching to a fishing line without the use of a bead.

The general purpose of the present invention, which will be described subsequently in greater detail, is to provide a new adjustable bobber system that has many of the advantages of the bobber devices mentioned heretofore and many novel features that result in a new adjustable bobber system which is not anticipated, rendered obvious, suggested, or even implied by any of the prior art bobber devices, either alone or in any combination thereof.

To attain this, the present invention generally comprises a hook member connected to a buoyant member. The hook member includes a body with an open end that receives the buoyant member, a jaw extending from the body with a slot within, and a slit extending into the jaw to the slot for receiving the fishing line below a stop knot. The buoyant member is preferably constructed of an elongated buoyant material, such as polyethelene or plastic foam, that is easily severed in any position by a cutting device. The user first ties the stop knot along the fishing line in the desired location. The user then simply engages the hook member upon the fishing line below the stop knot. If the user desires less remaining buoyancy, the user simply removes a portion of the buoyant member with a conventional cutting device, such as a scissors. A marker band is preferably adjustably positioned about the buoyant member for providing a visible mark upon the buoyant member that is a finite distance above the water level when the fishing lure and/or bait are attached. If the fish engages the bait and pulls the buoyant member downwardly, the marker band will become submerged informing the fisherman that a fish is present. Because the hook member remains in contact with the fishing line at all times beneath the water surface, there is not freezing of the fishing line to the hook member. In addition, any ice buildup upon the buoyant member can be easily removed by simply squeezing or bending the buoyant member without breaking or damaging the buoyant member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an adjustable bobber system that will overcome the shortcomings of the prior art devices.

Another object is to provide an adjustable bobber system that has adjustable buoyancy.

An additional object is to provide an adjustable bobber system that has a narrow diameter for allowing less water displacement per unit length.

A further object is to provide an adjustable bobber system that does not require the use of beads.

Another object is to provide an adjustable bobber system that does not require the use of split shots.

Another object is to provide an adjustable bobber system that reduces freezing of the fishing line to the bobber by maintaining the physical contact of the bobber and the fishing line below the water surface.

A further object is to provide an adjustable bobber system that can be easily attached and easily removed from the fishing line without damaging the fishing line.

Another object is to provide an adjustable bobber system that reduces the chance of binding upon the fishing line when reeling in the fishing line.

Still another object is to provide an adjustable bobber system that allows a long enough portion above the water surface to be visibly noticed by the fisherman.

Another object is to provide an adjustable bobber system that allows the removal of ice buildup without damage or breakage.

A further object is to provide an adjustable bobber system that is less prone to binding upon the fishing line when the fishing line is being reeled in.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
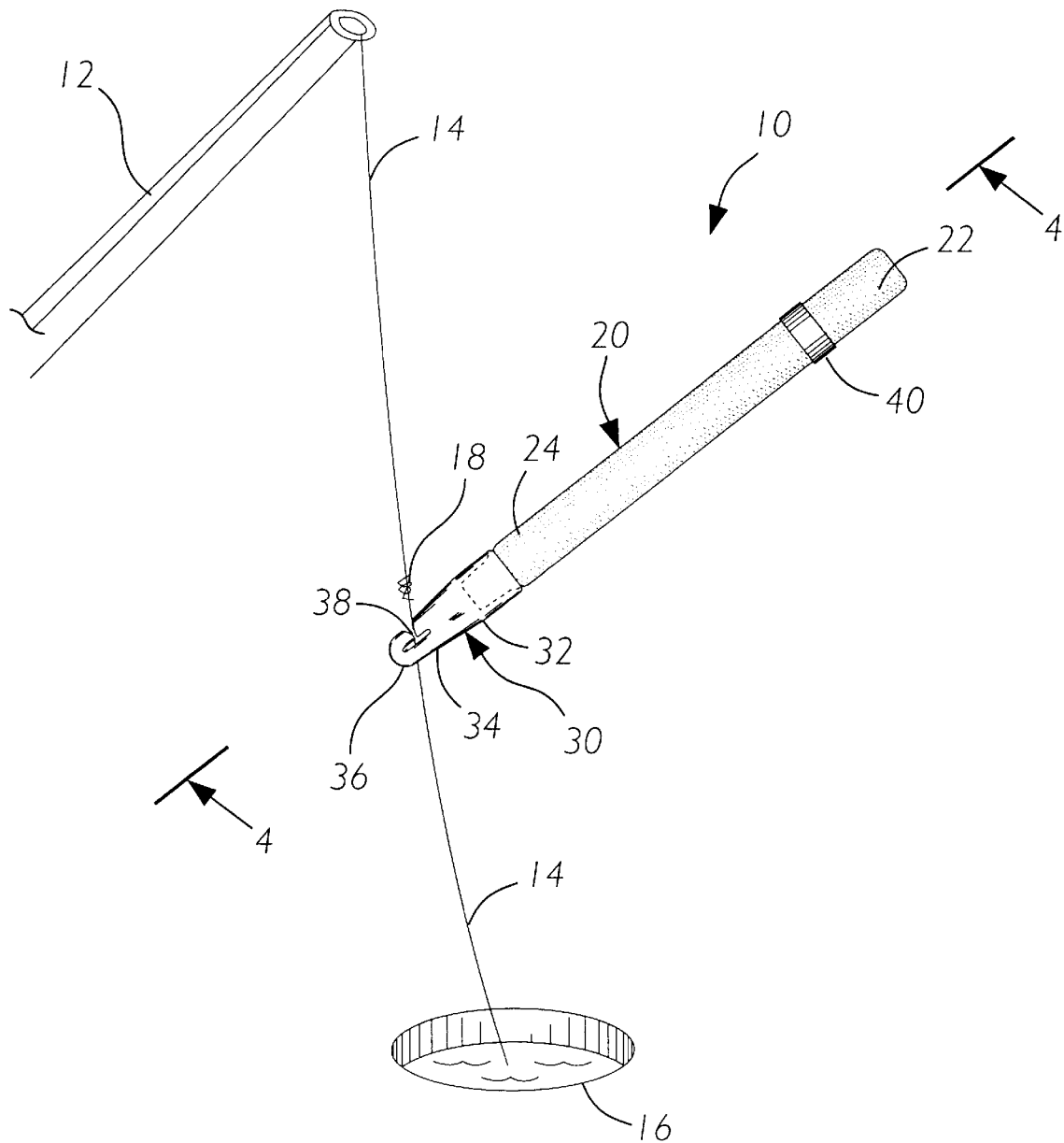
FIG. 1 is an upper perspective view of the present invention attached to the fishing line.

Turning now descriptively to the drawings, in which similar reference characters denote similar elements throughout the several view, FIGS. 1 through 4 illustrate an adjustable bobber system 10, which comprises a hook member 30 connected to a buoyant member 20. The hook member 30 includes a body 32 with an open end 31 that receives the buoyant member 20, a jaw 34 extending from the body 32 with a slot 36 within, and a slit 38 extending into the jaw 34 to the slot 36 for receiving the fishing line 14 below a stop knot 18. The buoyant member 20 is preferably constructed of an elongated buoyant material, such as plastic foam, that is easily severed in any position by a cutting device 11. The user first ties the stop knot 18 along the fishing line 14 in the desired location. The user then simply engages the hook member 30 upon the fishing line 14 below the stop knot 18. If the user desires less remaining buoyancy, the user simply removes a portion of the buoyant member 20 with a conventional cutting device 11, such as a scissors. A marker band 40 is preferably adjustably positioned about the buoyant member 20 for providing a visible mark upon the buoyant member 20 that is a finite distance above the water level when the fishing lure and/or bait are attached. If the fish engages the bait and pulls the buoyant member 20 downwardly, the marker band 40 will become submerged informing the fisherman that a fish is present. Because the hook member 30 remains in contact with the fishing line 14 at all times beneath the water surface, there is not freezing of the fishing line 14 to the hook member 30. In addition, any ice buildup upon the buoyant member 20 can be easily removed by simply squeezing or bending the buoyant member 20 without breaking or damaging the buoyant member 20.

As shown in FIG. 1 of the drawings, the hook member 30 is engaged to the fishing line 14 of a fishing rod 12 below the stop knot 18. The hook member 30 and the buoyant member 20 are then lowered into the ice hole 16 there after supporting bait or fishing lure. The hook member 30 is preferably constructed of a plastic material, however any well-known material may be utilized. The buoyant member 20 is preferably constructed of a foam rubber material or other resilient buoyant material that can be severed by a conventional cutting device 11.

Figure 2:
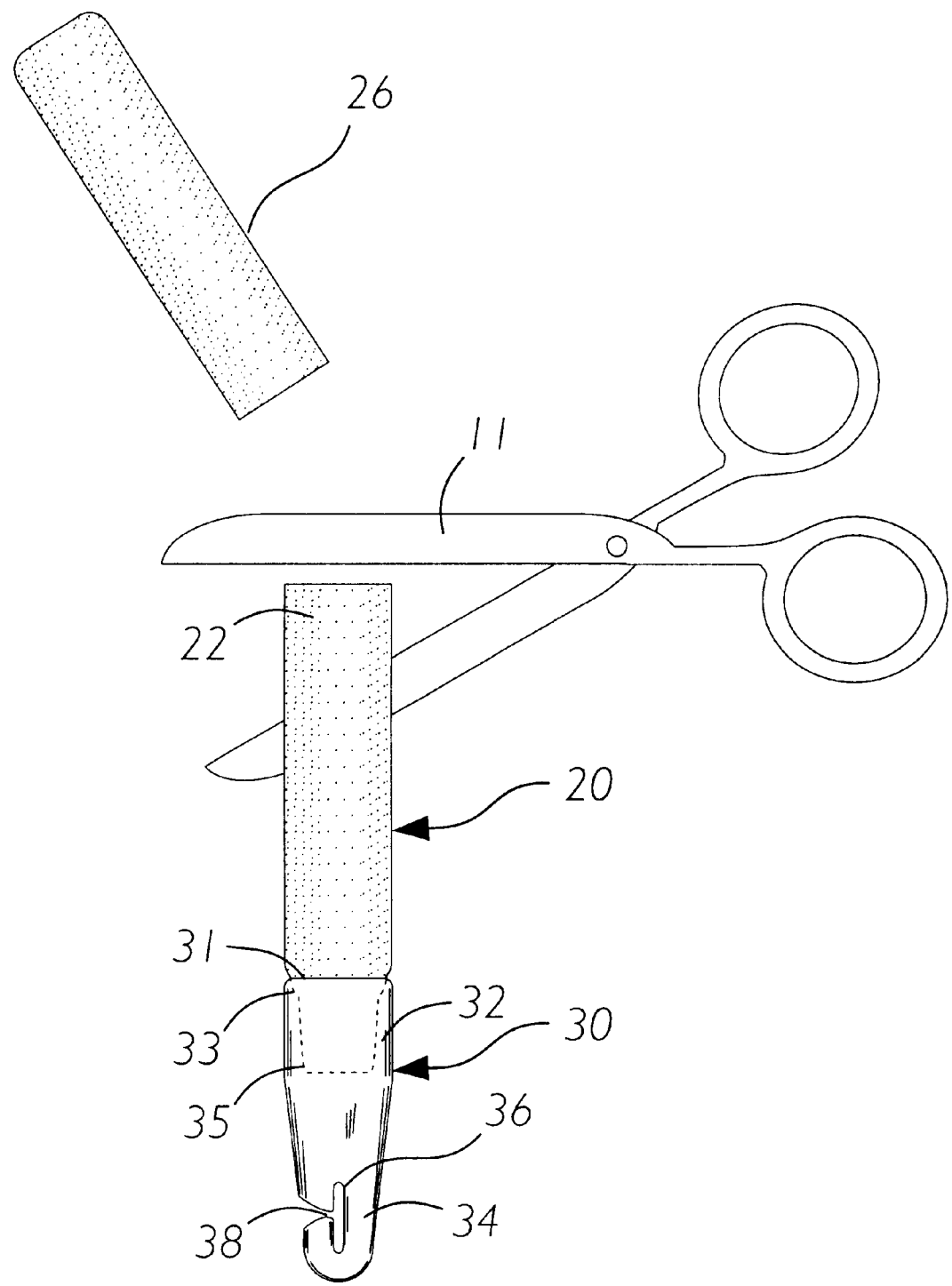
FIG. 2 is a side view of the present invention with a scissors severing a desired portion to adjust the buoyancy.
Figure 3:
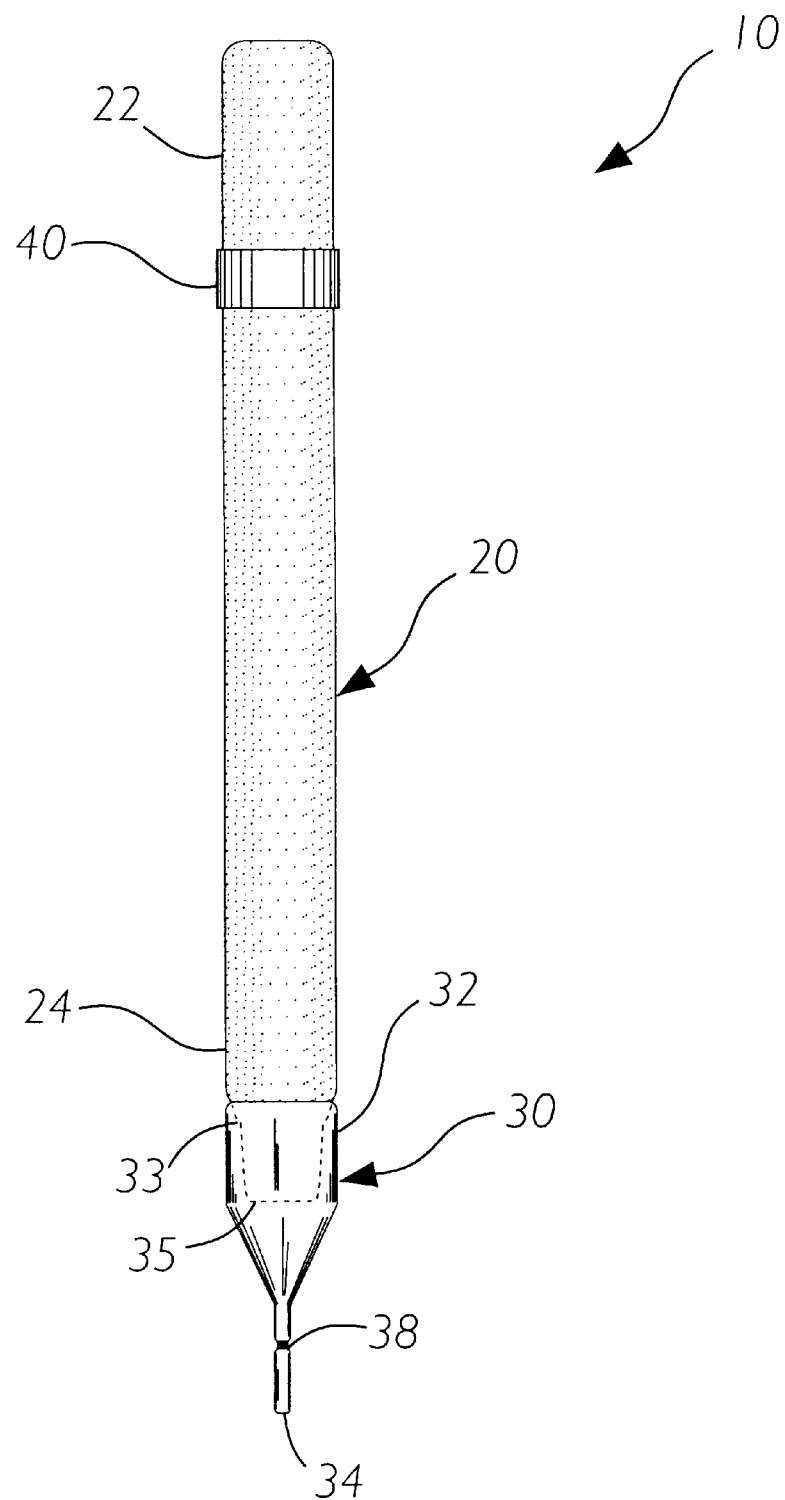
FIG. 3 is a front view showing the slit in the hook member.
Figure 4:
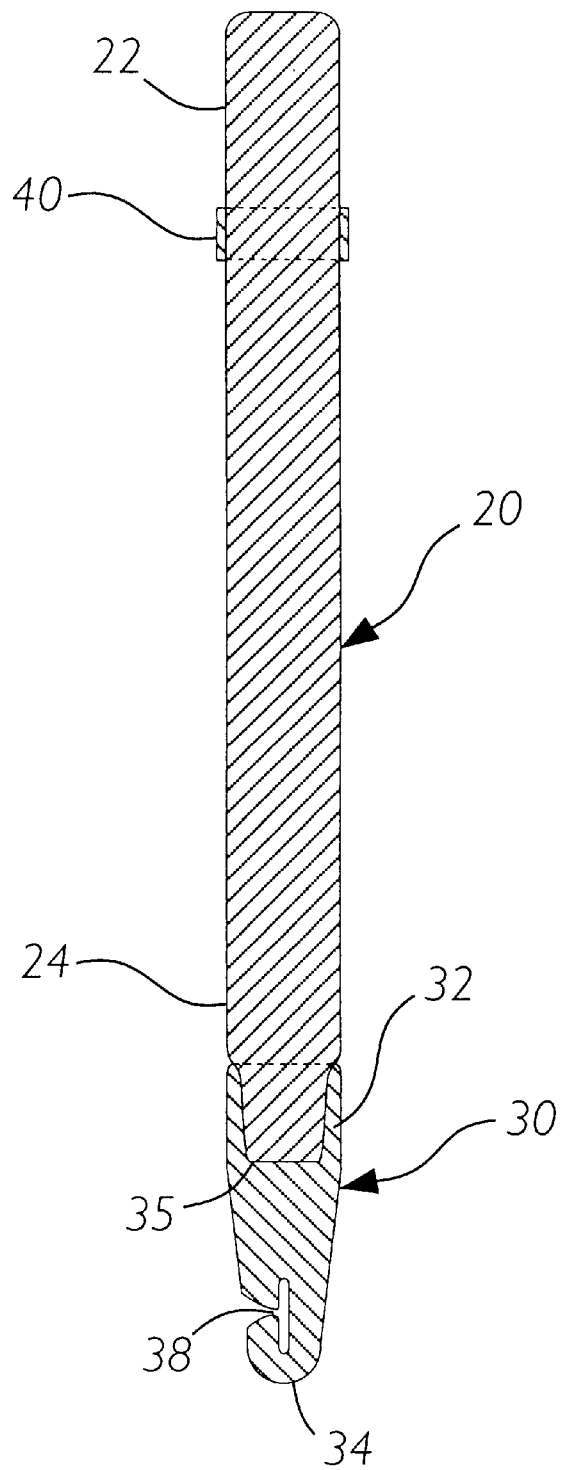
FIG. 4 is a cross sectional view taken along line 4—4 of FIG. 1.

As shown in FIGS. 1 through 4, the hook member 30 has a body 32 containing an open end 31 that exposes a cavity 35 within the hook member 30. As best shown in FIG. 4 of the drawings, the open end 31 includes a tapered edge 33 for easily receiving the buoyant member 20.

As best shown in FIGS. 2 and 4, the hook member 30 includes a jaw 34. The jaw 34 is preferably is narrower than the body 32 of the hook member 30 as shown in FIG. 3 of the drawings. As shown in FIG. 2, the jaw 34 includes a slot 36 within a central portion near the distal end thereof. The slot 36 is wider than the diameter of the fishing line 14 to allow free movement of the fishing line 14 within. As best shown in FIG. 2, a tapered slit 38 extends into a side of the jaw 34 exposing the slot 36. The tapered slit 38 has a broad portion and a narrow portion, with the narrow portion adjacent the slot 36. The narrow portion of the slit 38 is wide enough to snugly allow the insertion of the fishing line 14 through into the slot 36.

As shown in FIGS. 1 and 3 of the drawings, the buoyant member 20 has an upper end 22 and a lower end 24. The lower end 24 is secured within the cavity 35 of the hook member 30 by conventional securing materials such as glue or any wellknown mechanical securing means. The buoyant member 20 is preferably of an elongated structure. The buoyant member 20 preferably has a cylindrical shape, however it can be appreciated that any well-known elongated shape may be utilized. The buoyant member 20 is constructed of a buoyant material that is preferably flexible and resilient. The relatively elongated narrow structure of the buoyant member 20 provides less water displacement per unit length than conventional bobber devices. The user simply removes a severed portion 26 of the buoyant member 20 to adjust the buoyancy of the buoyant member 20 and the hook member 30 as shown in FIG. 2 of the drawings.

As shown in FIGS. 1 and 3 of the drawings, a marker band 40 is preferably provided that adjustably surrounds the buoyant member 20 for marking the position of the buoyant member 20 relative to the water surface within the ice hole 16. The marker band 40 is preferably comprised of a flexible material, such as rubber, and preferably has a distinct color from the buoyant member 20 for easy visibility during all conditions.

In use, the user lowers the fishing line 14 with the bait and/or lure attached to the desired depth within the ice hole 16. After the user has determined the needed length of fishing line 14 below the water level to retain the bait at the desired depth, the user then secures a stop knot 18 upon the fishing line 14 at the desired length. The user then simply inserts the fishing line 14 into the slit 38 of the hook member 30 until the fishing line 14 is slidably positioned within the slot 36 of the jaw 34. The user then lowers the fishing rod 12 and/or fishing line 14 so that the buoyant member 20 is supporting the bait at the desired depth. If there is to much buoyancy to the buoyant member 20, the user simply trims a severed portion 26 off the buoyant member 20 to achieve the desired buoyancy. Once the desired buoyancy is achieved, the user then positions the marker band 40 at the desired elevation above the water surface within the ice hole 16 to indicate whether a fish is engaging the bait. During use, the buoyant member 20 is vertically positioned within the water with the jaw 34 in engagement with the stop knot 18. The slot 36 is narrower than the stop knot 18 to prevent the stop knot 18 from extending through. Once a fish engages the bait, the buoyant member 20 is pulled under the water surface until the user engages the hook or the fish is removed. If the user is able to catch the fish, the user begins to reel the fishing line 14 into the fishing rod 12. The buoyant member 20 lays horizontal upon the water surface while the fishing line 14 is being reeled in thereby reducing the chance of the fishing line 14 binding within the slot 36 of the hook member 30. If there is ice buildup upon the buoyant member 20, the user simply squeezes or bends the buoyant member 20 thereby releasing any ice buildup without fear of damaging or breaking the buoyant member 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable bobber system, comprising:
   a hook member having an open end exposing a cavity and an engaging side for releasably engaging a fishing line; and
   an elongated buoyant member having a lower end and an upper end, wherein said lower end of said buoyant member is secured within said cavity of said hook member;
   wherein said buoyant member is comprised of a material capable of being severed by a cutting device wherein said buoyant member is comprised of foam rubber material.

2. The adjustable bobber system of claim 1, wherein said buoyant member is resilient and flexible for allowing easy removal of ice buildup therefrom.

3. The adjustable bobber system of claim 2, wherein said hook member further comprises:
   a jaw extending from a body of said hook member;
   a slot within said jaw; and
   a slit extending into a side of said jaw connecting to said slot.

4. The adjustable bobber system of claim 3, wherein said slot is wider than a diameter of said fishing line for allowing said fishing line to slide within said slot.

5. The adjustable bobber system of claim 4, wherein said slit has a broad portion and a narrow portion thereby tapering toward said slot.

6. The adjustable bobber system of claim 5, wherein said narrow portion of said slit is wide enough to snugly receive said fishing line.

7. The adjustable bobber system of claim 6, wherein said open end of said body has a tapered edge.

8. An adjustable bobber system, comprising:
   a hook member having an open end exposing a cavity and an engaging side for releasably engaging a fishing line; and
   an elongated buoyant member having a lower end and an upper end, wherein said lower end of said buoyant member is secured within said cavity of said hook member;
   wherein said buoyant member is comprised of a material capable of being severed by a cutting device; wherein said buoyant member is comprised of foam rubber material
   a marking means adjustably securable to said buoyant member for marking a position of said buoyant member with respect to a water surface.

9. The adjustable bobber system of claim 8, wherein said buoyant member is resilient and flexible for allowing easy removal of ice buildup therefrom.

10. The adjustable bobber system of claim 9, wherein said hook member further comprises:
    a jaw extending from a body of said hook member;
    a slot within said jaw; and
    a slit extending into a side of said jaw connecting to said slot.

11. The adjustable bobber system of claim 10, wherein said slot is wider than a diameter of said fishing line for allowing said fishing line to slide within said slot.

12. The adjustable bobber system of claim 11, wherein said slit has a broad portion and a narrow portion thereby tapering toward said slot.

13. The adjustable bobber system of claim 12, wherein said marking means comprises a marker band.

14. The adjustable bobber system of claim 13, wherein said open end of said body has a tapered edge.

* * * * *